United States Patent Office
3,730,851
Patented May 1, 1973

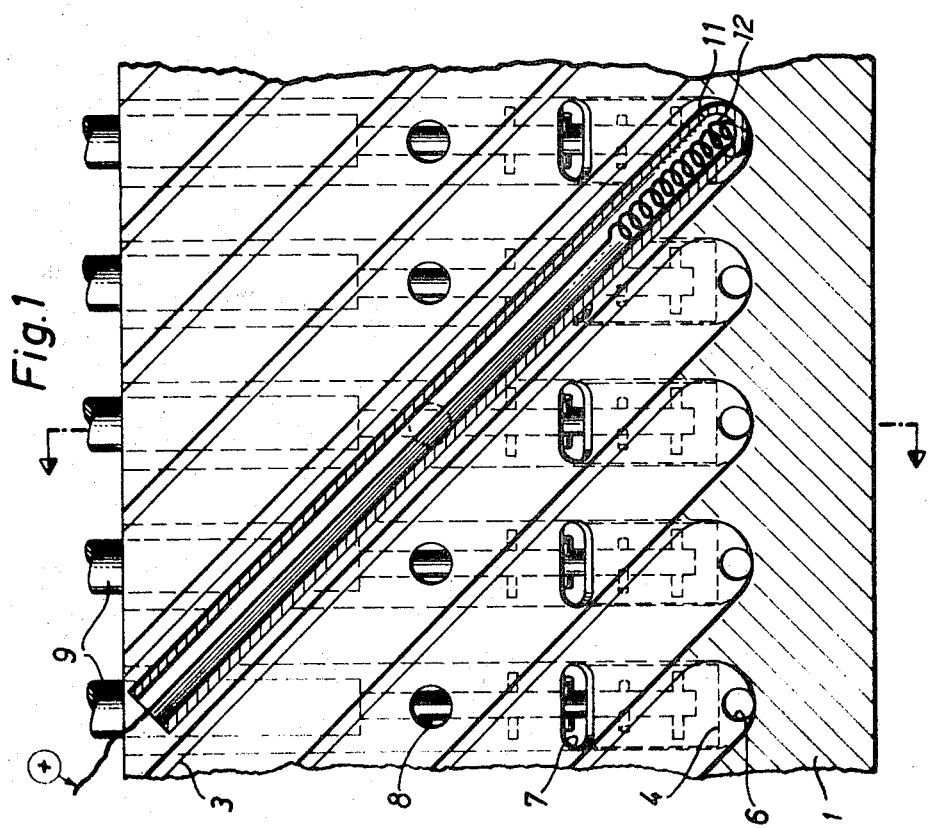
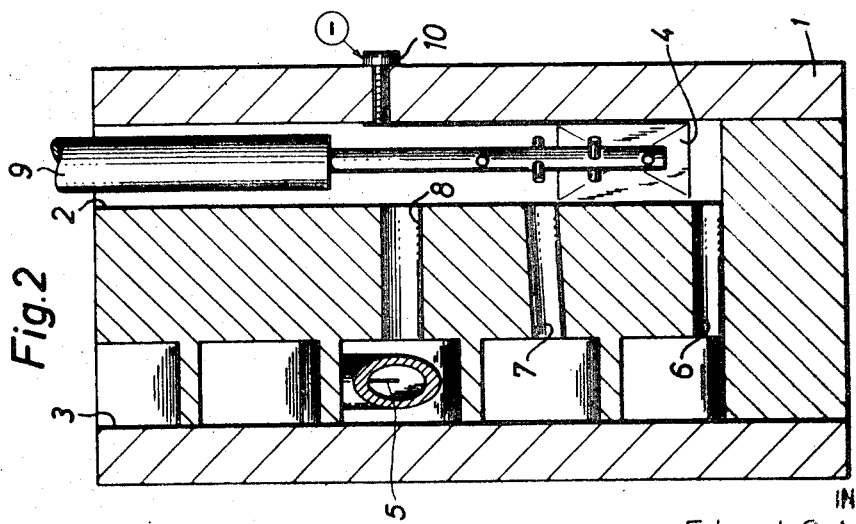

3,730,851
METHOD FOR THE CONTINUOUS SEPARATION OF PLUTONIUM FROM URANIUM IN THE TWO-PHASE SYSTEM BY MEANS OF ELECTROLYTIC REDUCTION
Eduard Schwind, Karlsruhe, and Peter Schlosser, Leopoldshafen, Germany, assignors to Gesellschaft für Kernforschung m.b.H., Karlsruhe, Germany
Filed Feb. 5, 1970, Ser. No. 9,010
Claims priority, application Germany, Feb. 5, 1969, P 19 05 519.7
Int. Cl. B01k 3/00
U.S. Cl. 204—1.5    8 Claims

ABSTRACT OF THE DISCLOSURE

A method of separating uranium compounds and plutonium compounds by liquid-liquid extraction in which the plutonium is reduced to the trivalent stage by electrolytic reduction, with the plutonium being reduced during the extraction process in a region of thorough mixing of aqueous and organic phase and separated together with the aqueous phase.

---

The invention relates to a method for the separation by liquid-liquid extraction of uranium and plutonium contained in the organic and/or aqueous phases, the plutonium being reduced to trivalent plutonium during extraction and changing into the aqueous phase because of the different distribution coefficient. In this valency plutonium is soluble in the organic solvent only to a very small extent. It changes into the aqueous phase and thus separates from the uranium, which remains in the organic phase.

In an extraction of this type it is known, for instance, that the reduction of plutonium to the trivalent state can be achieved by iron(II) sulphamate which is added to the extraction column. The disadvantage in using iron(II) sulphamate is the sufficiently high iron(II)/iron(III) ratio required for a quantitative plutonium reduction. Another disadvantage is that large quantities of foreign substances are introduced into the process through the use of iron(II) sulphamate which results in an undesirable increase in waste. Moreover, another method is known which brings about a reduction of plutonium to trivalent plutonium by adding uranium(IV) nitrate as a reducing agent. This method is more advantageous relative to the methods described earlier because no foreign substances are introduced into the process, as the uranium nitrate used for reduction is a constituent proper of the process stream. In addition, the large distance between the redox potentials of Pu(IV)/Pu(III) and U(VI)/U(IV) seems to indicate that the complete reduction to Pu(III) can be achieved already with a smaller excess of this reducing agent as against the iron(II) sulphamate reduction process described above.

Nevertheless, a four to sixfold excess of U(IV) based on the stoichiometric reaction equation $$2Pu(IV) + U(IV) \leftrightarrow 2Pu(III) + U(VI)$$

is necessary for a quantitative separation of plutonium from the organic phase. Thus, a solution containing, for instance, 94% U and 6% Pu would require an additional 18% U as a reducing agent in the form of a uranium(IV) nitrate solution so that 112% U instead of only 94% of the uranium contained in the nuclear fuel will flow in the process stream. Since the uranium(IV) nitrate solution is prepared in relatively small quantities and in small plants which do not operate at optimum economic efficiency, this reducing agent in addition is very expensive.

In principle, it is possible also to use a uranyl nitrate solution which is not free from plutonium for preparation of the uranium(IV) nitrate solution. However, the required safety measures in this case would further increase the price of the reducing agent obtained.

One other aggravating factor in using a uranium(IV) nitrate solution as the reducing agent is that this solution must be subjected to continuous analytical control and, on the other hand, must be metered into the process very accurately, which calls for accurately operating metering pumps.

Therefore, it is the objective of the invention to avoid the disadvantages of the methods mentioned above. In a method of separation by liquid-liquid extraction, of uranium and plutonium contained in an organic solution and/or aqueous phase, where the plutonium is reduced to trivalent plutonium during extraction and changes into the aqueous phase because of the different distribution coefficient, this is achieved by changing the plutonium to the trivalent state by electrolytic reduction in the very extraction process in the region of through mixing of the aqueous and organic phases.

The method of electrolytic reduction of plutonium to trivalent plutonium according to the invention by electrodes installed directly in the extraction apparatus offers the additional advantage that the hexavalent uranium present can be reduced to the tetravalent state by an increase in the cathode potential, which uranium in turn is now able to reduce the tetravalent plutonium to trivalent plutonium; so this secondary effect, which is encountered as an additional feature in the method according to the invention, accelerates and promotes the plutonium reduction. The possibility of enhancing the reduction of plutonium by a simultaneous reduction of uranium results from the position of the redox potentials.

The method according to the invention offers the advantage that it is no longer necessary to use major quantities of reducing agent for plutonium reduction to Pu(III) in the two phase system and that the use of a reducing agent which is alien to the process or is part of the process but would increase the amount of process solutions circulating in the stream is likewise no longer necessary. Thus, e.g., the use of U(IV) nitrate as a reducing agent would require two and a half times the weight of U(IV) with respect to plutonium, as is known from experience. In the case of a direct electrolytic reduction of the plutonium in a two phase system the costs of preparation and provision of the preferred reducing agent, U(IV) nitrate, are saved. In the same way, the correctly metered addition of reducing agent to the extraction process by means of a mechanical feeding device liable to many breakdowns, e.g., a metering pump, is not needed.

FIG. 1 is a sectional view of a device for carrying out the present invention, and FIG. 2 is a sectional view taken on the section line depicted in FIG. 1.

An example of a portion of the device for the execution of the method according to the invention is shown in FIGS. 1 and 2, as adapted from W. Ochsenfeld and S. Krawczynski, KERNTECHNIK, vol. 5 (1963), No. 5, p. 218.

The device for the execution of the method according to the invention is a familiar continuously operating multistage extraction apparatus i.e., a multistage mixer-settler device 1 in which the electrodes are installed in the region of thorough mixing of the two phases. In a mixer-settler, preferably only the cathode 4 is installed in the mixer region 2 of thorough mixing, while the anode 5 is installed in the settler 3, the demixing region of the two phases. However, the important point is that the anode extend into the region of the aqueous phase.

According to the invention, the cathode material used for the reduction of plutonium/uranium solutions acidified with nitric acid is gold or titanium. Reasons for using titanium cathodes as sheet or extruded metals are the price, the resistance to acids, and the high strength which is similar to that of steel.

Reasons for using gold are the favorable mechanical properties which permit the use of extremely thin gold foils and gold coatings. Moreover, gold is easily soldered and welded. Its electrical conductivity is excellent and the material is not passivated in solutions acidified with nitric acid. Its applicability in foils and coatings makes it attractive also in terms of the price. The equipment of a mixer-settler cell with a gold foil cathode costs only about DM 6—including the current feed lug. In the reduction experiments in uranium/plutonium solutions acidified with nitric acid gold cathodes proved to be corrosion resistant.

The anode 5 used in the invention is an electrode installed in a diaphragm 11 closed at its bottom end and made of noble metal or at least coated with noble metal, resistant to acid and/or anodic oxygen and made out of an electrically conducting carrier material, preferably a platinum-plated titanium, tantalum, or niobium electrode. The platinum plating protects the anode from passivation and makes it resistant to corrosion.

For the method according to the invention the electrode material is of importance, though not decisively so, i.e., cathode materials used may be also tantalum, niobium, carbon or graphite, and similar materials.

The diaphragm 11 must be impermeable in the region of the organic phase to prevent the atomic oxygen produced at the anode from contacting the organic phase. If a clay pipe is used as the diaphragm, it must be made impermeable by sulfur impregnation in the respective area. This can be achieved also by glass or ceramic coating.

Now, the invention will be described in greater detail on the basis of one embodiment in connection with the mixer-settler apparatus used for reduction extraction.

The 16-stage mixer-settler 1 used is a design customary in extraction technology. The action and major design features of this mixer settler are known from the literature (W. Ochsenfeld and S. Krawczynski, KERNTECHNIK, vol. 5 (1963), No. 5, p. 218). The mixer settler consists of 16 series arranged mixer chambers 2 and 16 settler chambers 3 arranged parallel to those with one mixer chamber each connected to three different successive settler chambers by three connection openings 6, 7 and 8 installed at different levels. Each mixer chamber 2 has a cross section of 16 by 16 mm. and a length of 110 mm., each settler chamber 3 has a square cross section of 15 by 15 mm. and is inclined at 45° relative to the mixer chamber, which is arranged preferably vertically. The bottom connection 6 is at the bottom of the chambers and has a circular cross section of 5 mm. diameter, the center connection 7 is a horizontal slot of 5 mm. height and 12 mm. width the lower edge of which is 30 mm. above the bottom of the chamber; the top connection 8 has a circular cross section of 7 mm. diameter with the lower edge situated 50 mm. above the bottom of the chambers.

Each mixer chamber 2 contains a stirrer 9 of V4A grade steel equipped with stirrer arms, the diameter of the stirrer axle being 5 mm. and its clearance from the bottom being 11.5 mm. Stirrer arms of V4A grade wire with a thickness of 2 mm. penetrate the vertical stirrer axle and are secured at regular intervals of 10 mm.; the length of the wires is 12 mm. in each case. The bottom stirrer arm is 3 mm. away from the bottom end of the stirrer axle. The sequence of the stirrer arms is displaced by an angle of 30° each relative to each other. The stirrers are moved by a common driving system at 1,200 revolutions per minute.

The cathodes 4 are contained in the second, third, fourth, fifth, sixth, seventh, ninth, and tenth mixer chambers the order of the chambers having been chosen so that the feed chamber for the aqueous phase is the first chamber. The cathode used is a gold foil of 0.02 mm. thickness which extends up to the level of the upper edge of the center connection slot 7 on three walls of the mixer chambers mentioned above and is attached with a self-hardening glue. For current feed the gold foil is extended to the top on the side facing the outside wall of the mixer-settler apparatus and is connected by a screw 10 with the connection lugs on the outside. The fourth wall of the mixer chamber contains the connection openings 6, 7, and 8 to the settler chambers and remains free from gold foil.

The anodes 5 are installed in the first, second, third, fourth, fifth, sixth, eighth, and ninth settler chambers. The settler chambers are numbered from the same end as the mixer chambers so that, e.g., the second settler chamber is connected with the first mixer chamber through the upper connection line, with the second mixer chamber through the central connection line, and with the third mixer chamber through the bottom connection line. The anodes are platinum coated titanium wires of 1 mm. diameter the lower end of which is helical. The length of the helices 12 is 30 mm., the outer diameter is 4–5 mm. The anodes are shielded by clay cells 11 which are cylindrically closed at the bottom, extend to the bottom of the settler chambers and are sulphur impregnated in their upper area contacting the organic phase. The outer diameter of the clay cells 11 is 10 mm., the wall thickness 2 mm. The cathodes and anodes, respectively, are connected in parallel by one bus bar each and are connected to a DC power source.

The tenth and sixteenth settler chambers contain one combined platinum calomel electrode each for potential control, while the eleventh settler chamber contains a 100° C. thermometer.

The uranium and plutonium contained in an organic solvent, preferably diluted tributyl phosphate (TBP), is fed into the eighth mixer chamber or one of the adjacent chambers. In the first mixer chamber the aqueous phase is fed in which contains diluted nitric acid and hydrazine as a stabilizer against re-oxidation of Pu(III) and U(IV), respectively, by nitrous acid. The aqueous phase takes up the mostly trivalent plutonium. An organic solvent solution like that in the eighth mixer chamber, but containing no plutonium or uranium, is continuously fed into the sixteenth settler chamber as a washing solution. This organic washing solution takes up the uranium present mainly in the hexavalent state.

Thus, it will be appreciated that the method of the present invention includes continuously flowing aqueous phase and organic phase through a plurality of settler chambers and a plurality of mixer chambers. The flow of aqueous phase through the chambers is countercurrent to the flow of the organic phase, and vice versa. Considering any set of two mixer chambers and two settler chambers, aqueous flow through the chambers is in a sequence of the type first through a first of the mixer chambers, thence through a first of the settler chambers, thence through the second of the mixer chambers, while organic flow through the chambers is in a sequence of the type first through the second of the settler chambers, thence through the first of the mixer chambers, thence through the first of the settler chambers. Aqueous and organic phases are mixed in mixing chambers and there, in areas of mixing of aqueous and organic phases, plutonium is electrolytically reduced to the trivalent state.

Example 240 ml./h. of a solution of 3.74 g. Pu/l., 47.5 g. U/l., 0.47 M $HNO_3$/l. in a mixture of 20% TBP and 80% alkane is fed into the eighth mixer chamber of the aqueous washing solution containing 0.6 M $HNO_3$/l. and 0.2 M hydrazine/l., 66 ml./h. is fed into the first mixer chamber. As an organic washing solution, 110 ml./h. of a solvent solution containing 20% TBP and 80% alkane is fed into the sixteenth settler chamber. The constant direct current voltage of 6.6 volts applied to the electrodes generates a current of some 490 ma. After some ten hours a dynamic equilibrium in the mixer-settler apparatus is reached. After a total of 13 hours, these quantities are found in the outlets of the aqueous phase: 14.7 g. Pu/l., 0.04 g. U/l., and 0.96 M $HNO_3$/l.

organic phase: 0.013 g. Pu/l., 31.8 g. U/l., and 0.27 M $HNO_3$/l.

The data regarding the extraction apparatus mentioned above, especially the design, number and arrangement of the electrodes, the design and number of individual stages of the extraction apparatus, are not restricted to the embodiment of the invention described herein. Thus, a different extraction apparatus which may be used could be an extraction column of any design, especially a pulsed column, or a rotating extraction device, for instance, a rapid extractor. In particular, the figures mentioned above and the chemical components can be varied and optimized within the framework of the invention.

We claim:

1. A continuously operating method of preferentially separating plutonium from an organic phase containing uranium and plutonium into an aqueous phase by liquid-liquid extraction with the plutonium being reduced to the trivalent state during extraction and, because of the different diffusion coefficient, changing into the aqueous phase, wherein the improvement comprises the steps of: continuously flowing aqueous phase through a plurality of settler chambers and a plurality of mixer chambers with the aqueous flow through the chambers being countercurrent to the flow of the organic phase and in a sequence of the type first through a first mixer chamber, thence through a first settler chamber, thence through a second mixer chamber; continuously flowing organic phase through said settler and mixer chambers with the organic phase flow being in a sequence of the type first through a second settler chamber, thence through the first mixer chamber, thence through the first settler chamber; mixing aqueous and organic phases in a plurality of said mixing chambers; and electrolytically reducing plutonium to the trivalent state in a plurality of the mixing chambers in areas of mixing of aqueous and organic phases.

2. A method as claimed in claim 1 wherein said uranium is present as hexavalent uranium and the step of electrolytically reducing includes simultaneously reducing hexavalent uranium to the tetravalent state.

3. A method as claimed in claim 1 wherein the step of reducing includes reducing uranium.

4. A method as claimed in claim 3 wherein the step of reducing is carried out with a cathode surface and an anode surface and at least the cathode surface is made of gold.

5. A method as claimed in claim 3 wherein titanium is cathode material in the step of reducing.

6. A method as claimed in claim 3 wherein a platinum coated tantalum, titanium, or niobium electrode is anode material in the step of reducing.

7. A method as claimed in claim 1, there being 16 mixer chambers and 16 settler chambers, with organic phase containing uranium and plutonium being fed into the eighth mixer chamber.

8. A method as claimed in claim 1, where the step of reducing comprises placing an anode in a diaphragm in a settler chamber, making the diaphragm impermeable in regions touched by organic phase in said settler chamber, placing a cathode in a mixer chamber connected with said settler chamber, and applying voltage between said anode and said cathode for electrolytically reducing plutonium to the trivalent state.

References Cited

UNITED STATES PATENTS

| | | | |
|---|---|---|---|
| 2,918,349 | 12/1959 | Seaborg | 23—341 |
| 3,276,850 | 10/1966 | Rainey | 23—341 |
| 3,361,651 | 1/1968 | Parkinson et al. | 204—1.5 |
| 3,616,275 | 10/1971 | Schneider et al. | 204—1.5 |
| 3,616,276 | 10/1971 | Schneider et al. | 204—1.5 |

FOREIGN PATENTS

| | | | |
|---|---|---|---|
| 1,113,237 | 5/1968 | Great Britain | 23—341 |
| 1,223,353 | 8/1966 | Germany | 204—1.5 |

REUBEN EPSTEIN, Primary Examiner

U.S. Cl. X.R.

23—341